United States Patent
Kaushik et al.

(10) Patent No.: US 12,456,740 B2
(45) Date of Patent: Oct. 28, 2025

(54) METHODS AND SYSTEMS FOR ESTIMATING PARAMETERS OF A CELL AT VARIOUS CHARGE-DISCHARGE PROFILES

(71) Applicant: SAMSUNG ELECTRONICS CO., LTD., Suwon-si (KR)

(72) Inventors: Anshul Kaushik, Bengaluru (IN); Atanu Talukdar, Bengaluru (IN); Rajkumar Subhash Patil, Bengaluru (IN); Shashishekara Parampalli Adiga, Bengaluru (IN); Daebong Jung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1113 days.

(21) Appl. No.: 17/318,169

(22) Filed: May 12, 2021

(65) Prior Publication Data
US 2021/0359317 A1  Nov. 18, 2021

(30) Foreign Application Priority Data

May 12, 2020 (IN) .............................. 202041020057
May 11, 2021 (IN) .............................. 202041020057
May 12, 2021 (KR) ........................ 10-2021-0061357

(51) Int. Cl.
*H01M 10/48* (2006.01)
*H01M 8/04537* (2016.01)
*H01M 8/0662* (2016.01)

(52) U.S. Cl.
CPC ..... *H01M 8/04641* (2013.01); *H01M 8/0687* (2013.01); *H01M 2250/20* (2013.01)

(58) Field of Classification Search
CPC ........... H01M 8/04641; H01M 8/0687; H01M 10/425–4285; H01M 10/48–488; G01R 31/392; G01R 31/389; G01R 31/367
See application file for complete search history.

(56) References Cited

U.S. PATENT DOCUMENTS

| | | | |
|---|---|---|---|
| 6,160,382 A | 12/2000 | Yoon et al. | |
| 2016/0003917 A1* | 1/2016 | You ...................... | G01R 31/367 702/63 |
| 2018/0043778 A1* | 2/2018 | Murbach .............. | G01R 31/389 |

FOREIGN PATENT DOCUMENTS

| JP | 2015-135286 A | 7/2015 |
|---|---|---|
| JP | 2019-61924 A | 4/2019 |

(Continued)

OTHER PUBLICATIONS

Korean Office Action issued on May 1, 2025, in corresponding Korean Patent Application No. 10-2021-0061357. (3pages in English, 8pages in Korean).

*Primary Examiner* — James Lee
(74) *Attorney, Agent, or Firm* — NSIP Law

(57) ABSTRACT

A method for estimating a plurality of parameters pertaining to an electrochemical model of a cell may include: obtaining, by a device, an Electrochemical Impedance Spectroscopy (EIS) spectrum and a Constant Current-Constant Voltage (CC-CV) charge-Constant Current (CC) discharge response of the cell; extracting, by the device, a plurality of features from the EIS spectrum and a plurality of features from the CC-CV charge-CC discharge response of the cell; and estimating, by the device, the plurality of parameters based on at least one of the plurality of features of the EIS spectrum and at least one of the plurality of features of the CC-CV charge-CC discharge response of the cell.

20 Claims, 10 Drawing Sheets

(56) References Cited

FOREIGN PATENT DOCUMENTS

| JP | 6524182 B2 | 6/2019 |
|---|---|---|
| KR | 10-2000-0033041 A | 6/2000 |
| KR | 10-2018-0095703 A | 8/2018 |

\* cited by examiner

METHODS AND SYSTEMS FOR ESTIMATING PARAMETERS OF A CELL AT VARIOUS CHARGE-DISCHARGE PROFILES

CROSS-REFERENCE TO RELATED APPLICATIONS

This application claims the benefit under 35 U.S.C. § 119(a) of Indian Provisional Patent Application No. 202041020057 filed on May 12, 2020 in the Indian Patent Office, Indian Complete Patent Application No. 202041020057 filed on May 11, 2021 in the Indian Patent Office, and Korean Patent Application No. 10-2021-0061357 filed on May 12, 2021 in the Korean Intellectual Property Office, the entire disclosures of which are incorporated herein by reference for all purposes.

BACKGROUND

1. Field

This disclosure relates to estimation of internal parameters of a battery (cell), and more particularly to methods and systems for predicting the state of a cell based on parameters of an electrochemical model of the cell.

2. Description of Related Art

The importance of rechargeable Lithium-ion (Li-ion) cells is increasing in sectors such as clean energy, particularly in the recent times, due to high energy and power density of the Li-ion cell. The high energy and power density allows the Li-ion cells to be compact in size and have lighter weight compared to other storage technologies. The Li-ion cells are finding wide application in devices such as mobile phones, laptops, electric vehicles, energy storage in conjunction with renewable energy sources such as solar and wind, and so on. Due to the complex chemical nature, the Li-ion cells' operation is required to be controlled by a Battery Management System (BMS). The BMS traditionally relies on an equivalent circuit model for battery (cell) state estimation.

The equivalent circuit model can be parameterized using macro level battery cycling and aging data. However, current advances have led towards applying Electrochemical-Thermal (ECT) models (such as pseudo-2D ECT model or a Reduced Order Model (ROM) ECT model) for estimating the state of the battery as they offer greater accuracy and additional functionalities. A reliable battery state estimation using the electrochemical models requires having accurate values of parameters pertaining to the cells such, as electrode geometry, electrical and chemical properties, and so on. However, the values of these parameters may not be known to a BMS developer as manufacturers of the cells are not likely to supply the values of parameters pertaining to the cells.

Currently, the parameters pertaining to the cells can be determined using techniques such as destructive testing (which involves breaking the cells and conducting tests on materials of the cells to estimate the parameters of the cells) and time consuming characterization techniques such as electron microscopy. The efforts involved in estimating the parameters of the cell using destructive testing and characterization techniques can accrue significant costs for designing the methods (performing estimation of battery state), particularly in terms of arrangement of elaborate experimental infrastructure and prolonged development time. The parameters of the cell are likely to change due to cell aging (because of prolonged usage). Further, in certain circumstances, a cell may be replaced. The issues involved in estimating the parameters of the cell are likely to get accentuated if parameters of multiple cells (provided by different suppliers) having distinct/different characteristics needs to be estimated for the same application supported by the BMS.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for estimating a plurality of parameters pertaining to an electrochemical model of a cell includes: obtaining, by a device, an Electrochemical Impedance Spectroscopy (EIS) spectrum and a Constant Current-Constant Voltage (CC-CV) charge-Constant Current (CC) discharge response of the cell; extracting, by the device, a plurality of features from the EIS spectrum and a plurality of features from the CC-CV charge-CC discharge response of the cell; and estimating, by the device, the plurality of parameters based on at least one of the plurality of features of the EIS spectrum and at least one of the plurality of features of the CC-CV charge-CC discharge response of the cell.

The EIS spectrum may indicate a variation of an impedance of the cell, wherein the variation in the impedance of the cell occurs due to variation of frequency of an input pulse applied to the cell, wherein the impedance of the cell includes any one or any combination of any two or more of an impedance of a positive electrode of the cell, an impedance of a negative electrode of the cell, and an impedance of a separator, wherein the separator is positioned between the positive electrode and the negative electrode.

The impedance of the positive electrode may be determined based on any one or any combination of any two or more of a solid state potential of the positive electrode, a thickness of the cell, an electrolyte potential at the positive electrode, and a thickness of the separator, wherein the impedance of the negative electrode is determined based on any one or any combination of any two or more of an electrolyte potential at the negative electrode, a thickness of the negative electrode, and a solid state potential of the negative electrode, wherein the impedance of the separator is determined based on either one or both of a thickness of the separator and an electrolyte ionic conductivity.

The EIS spectrum may include a plurality of frequency regions, wherein at least one electrochemical process occurs in the cell in each of the plurality of frequency regions, wherein at least one parameter, from amongst the plurality of parameters, is estimated from each of the plurality of frequency regions based on the at least one electrochemical process occurring in the cell in each of the plurality of frequency regions.

The CC-CV charge-CC discharge response may be obtained based on a potential drop across the positive electrode and the negative electrode, wherein the potential drop across the positive electrode and the negative electrode is determined based on a solid state potential of the positive electrode and a solid state potential of the negative electrode.

The solid state potential of the positive electrode may be determined based on any one or any combination of any two or more of an electrolyte potential of the positive electrode, an Open Circuit Potential (OCP) of the positive electrode, an exchange current density at the positive electrode, and an intercalation current at the positive electrode, wherein the solid state potential of the negative electrode is determined based on any one or any combination of any two or more of an electrolyte potential of the negative electrode, an OCP of the negative electrode, an exchange current density at negative electrode, and an intercalation current at the negative electrode.

State of Charge (SOC) bounds, including a maximum SOC and a minimum SOC, pertaining to each of the positive electrode and the negative electrode may be provided to an EIS model for estimating at least one parameter from amongst the plurality of parameters, wherein the EIS estimates the at least one parameter based on the plurality of features extracted from the EIS spectrum.

The SOC bounds pertaining to each of the positive electrode and the negative electrode may be determined by matching a plot of variation of a rate of change of charge stored in the cell with respect to an estimated Open Circuit Voltage (OCV) of the cell and a plot of variation of a rate of change of charge stored in the cell with respect to an experimental OCV of the cell.

At least one of the plurality of parameters may be sensitive to the at least one of the plurality of features of the EIS spectrum and the at least one of the plurality of features of the CC-CV charge-CC discharge response.

The plurality of features of the EIS spectrum may include a magnitude of impedance at a valley point in the EIS spectrum, a magnitude of the peak impedance in the EIS spectrum, and a magnitude of impedance of the lowest frequency in the EIS spectrum.

The plurality of features of the CC-CV charge-CC discharge response may include a total charging time period, a CC charging time period, a CV charging time period, a rest period after a charging cycle, a rest period after a discharging cycle, a CC discharging time period, a voltage drop at predefined time instances during at least one discharging cycle.

Intermediate values of the plurality of parameters may be optimized to obtain the estimated plurality of parameters, wherein the optimization continues until the intermediate values of the plurality of parameters match with experimentally determined values of the plurality of parameters, wherein the intermediate values of the plurality of parameters are optimized using any one or any combination of any two or more of genetic method, particle swarm optimization, and gradient descent.

The plurality of parameters may include a particle radius of the positive electrode, a particle radius of the negative electrode, an electrolyte volume fraction in the positive electrode, an electrolyte volume fraction in the negative electrode, an electrolyte volume fraction in the separator, a volume fraction of the active material in the positive electrode, a volume fraction of the active material in the negative electrode, a reaction rate constant at the positive electrode, a reaction rate constant negative electrode, solid phase diffusion in the positive electrode, a solid phase diffusion in the negative electrode, an electronic conductivity of the active material of the positive electrode, an electronic conductivity of the active material of the negative electrode, an ionic concentration in an electrolyte of the cell, the thickness of the positive electrode, the thickness of the negative electrode, and a Brugmann constant.

The method may further include: detecting, by a Battery Management System BMS, at least one update in at least one parameter, from amongst the plurality of parameters; and estimating, by the BMS, the at least one update in the at least one parameter based on variation in any one or any combination of any two or more of capacity of the cell, voltage of the cell, current flowing through the cell, and impedance of the cell.

The detection of the at least one update in the at least one parameter may be initiated by one of: applying a current burst on the cell, introducing a rest period of a predefined time duration after charging the cell, introducing a rest period of predefined time duration after discharging the cell, charging the cell at a predefined C-rate for at least one cycle, and discharging the cell at a predefined C-rate for at least one cycle.

The detection of the at least one update in the at least one parameter may be initiated in at least one condition including: the cell has undergone a predefined number of discharging cycles, the cell has undergone a predefined number of charging cycles, and at least one cell in one of a device and electric vehicle, hosting the cell, has been replaced.

The variation in any one or any combination of any two or more of capacity of the cell, voltage of the cell, current flowing through the cell, and impedance of the cell is estimated based on either one or both of a gradient based technique and a filtering based technique.

In another general aspect, a device for estimating a plurality of parameters pertaining to an electrochemical model of a cell is configured to: obtain an Electrochemical Impedance Spectroscopy (EIS) spectrum and a Constant Current-Constant Voltage (CC-CV) charge-Constant Current (CC) discharge response of the cell; extract a plurality of features from the EIS spectrum and a plurality of features from the CC-CV charge-CC discharge response of the cell; and estimate the plurality of parameters based on at least one of the plurality of features of the EIS spectrum and at least one of the plurality of features of the CC-CV charge-CC discharge response of the cell.

The EIS spectrum may indicate a variation of an impedance of the cell, wherein the variation in the impedance of the cell occurs due to variation of frequency of an input pulse applied to the cell, wherein the impedance of the cell includes any one or any combination of any two or more of an impedance of a positive electrode of the cell, an impedance of a negative electrode of the cell, and an impedance of a separator, wherein the separator is positioned between the positive electrode and the negative electrode.

The impedance of the positive electrode may be determined based on any one or any combination of any two or more of a solid state potential of the positive electrode, a thickness of the cell, an electrolyte potential at the positive electrode, and a thickness of the separator, wherein the impedance of the negative electrode is determined based on any one or any combination of any two or more of an electrolyte potential at the negative electrode, a thickness of the negative electrode, and a solid state potential of the negative electrode, wherein the impedance of the separator is determined based on either one or both of a thickness of the separator and an electrolyte ionic conductivity.

The EIS spectrum may include a plurality of frequency regions, wherein at least one electrochemical process occurs in the cell in each of the plurality of frequency regions, wherein at least one parameter, from amongst the plurality of parameters, is estimated from each of the plurality of frequency regions based on the at least one electrochemical process occurring in the cell in each of the plurality of frequency regions.

The CC-CV charge-CC discharge response may be obtained based on a potential drop across the positive electrode and the negative electrode, wherein the potential drop across the positive electrode and the negative electrode is determined based on a solid state potential of the positive electrode and a solid state potential of the negative electrode.

The solid state potential of the positive electrode may be determined based on any one or any combination of any two or more of an electrolyte potential of the positive electrode, an Open Circuit Potential (OCP) of the positive electrode, an exchange current density at the positive electrode, and an intercalation current at the positive electrode, wherein the solid state potential of the negative electrode is determined based on any one or any combination of any two or more of an electrolyte potential of the negative electrode, an OCP of the negative electrode, an exchange current density at negative electrode, and an intercalation current at the negative electrode.

State of Charge (SOC) bounds, including a maximum SOC and a minimum SOC, pertaining to each of the positive electrode and the negative electrode may be provided to an EIS model for estimating at least one parameter from amongst the plurality of parameters, wherein the EIS estimates the at least one parameter based on the plurality of features extracted from the EIS spectrum.

The SOC bounds pertaining to each of the positive electrode and the negative electrode may be determined by matching a plot of variation of a rate of change of charge stored in the cell with respect to an estimated Open Circuit Voltage (OCV) of the cell and a plot of variation of a rate of change of charge stored in the cell with respect to an experimental OCV of the cell.

At least one of the plurality of parameters may be sensitive to the at least one of the plurality of features of the EIS spectrum and the at least one of the plurality of features of the CC-CV charge-CC discharge response.

The plurality of features of the EIS spectrum may include a magnitude of impedance at a valley point in the EIS spectrum, a magnitude of the peak impedance in the EIS spectrum, and a magnitude of impedance of the lowest frequency in the EIS spectrum.

The plurality of features of the CC-CV charge-CC discharge response may include a total charging time period, a CC charging time period, a CV charging time period, a rest period after a charging cycle, a rest period after a discharging cycle, a CC discharging time period, a voltage drop at predefined time instances during at least one discharging cycle.

Intermediate values of the plurality of parameters may be optimized to obtain the estimated plurality of parameters, wherein the optimization continues till the intermediate values of the plurality of parameters match with experimentally determined values of the plurality of parameters, wherein the intermediate values of the plurality of parameters are optimized using any one or any combination of any two or more of genetic method, particle swarm optimization, and gradient descent.

The plurality of parameters may include a particle radius of the positive electrode, a particle radius of the negative electrode, an electrolyte volume fraction in the positive electrode, an electrolyte volume fraction in the negative electrode, an electrolyte volume fraction in the separator, a volume fraction of the active material in the positive electrode, a volume fraction of the active material in the negative electrode, a reaction rate constant at the positive electrode, a reaction rate constant negative electrode, solid phase diffusion in the positive electrode, a solid phase diffusion in the negative electrode, an electronic conductivity of the active material of the positive electrode, an electronic conductivity of the active material of the negative electrode, an ionic concentration in an electrolyte of the cell, the thickness of the positive electrode, the thickness of the negative electrode, and a Brugmann constant.

The device may be further configured to: detect at least one update in at least one parameter, from amongst the plurality of parameters; and estimate the at least one update in the at least one parameter based on variation in any one or any combination of any two or more of capacity of the cell, voltage of the cell, current flowing through the cell, and impedance of the cell.

The detection of the at least one update in the at least one parameter may be initiated by one of: applying a current burst on the cell, introducing a rest period of a predefined time duration after charging the cell, introducing a rest period of predefined time duration after discharging the cell, charging the cell at a predefined C-rate for at least one cycle, and discharging the cell at a predefined C-rate for at least one cycle.

The detection of the at least one update in the at least one parameter may be initiated in at least one condition including: the cell has undergone a predefined number of discharging cycles, the cell has undergone a predefined number of charging cycles, and at least one cell in one of a device and electric vehicle, hosting the cell, has been replaced.

The variation in any one or any combination of any two or more of capacity of the cell, voltage of the cell, current flowing through the cell, and impedance of the cell may be estimated based on either one or both of a gradient based method and a filtering based method.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
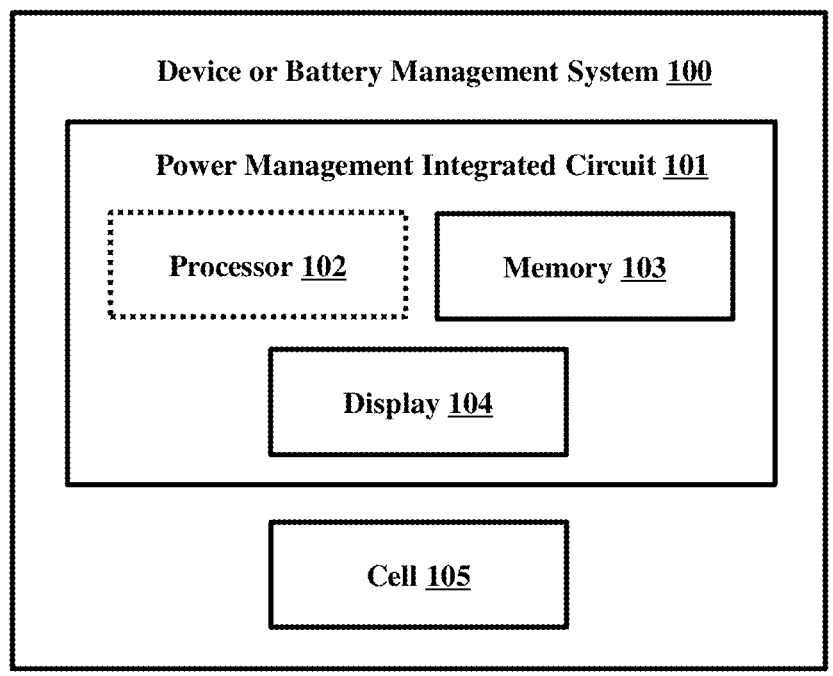
FIG. 1 depicts a Battery Management System (BMS) configured to predict the state of a cell by estimating a plurality of parameters of the cell, according to embodiments as disclosed herein.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

The embodiments herein may provide methods and systems for estimating parameters pertaining to an electrochemical model (implemented in a Battery Management System (BMS)) of a cell for accurately estimating the state of the cell in different operating conditions, wherein the estimated parameters can be classified as geometric parameters, kinetic parameters, thermodynamic parameters, or transport parameters.

The embodiments herein may utilize Electrochemical Impedance Spectroscopy (EIS) and relevant cycling (charge or discharge) data (responses) of the cell, in conjunction with an EIS model and a Reduced Order Model (ROM) or Pseudo 2-Dimensional (P2D), to estimate the parameters in a cost effective and non-destructive manner.

The embodiments herein may isolate individual electrochemical processes/phenomena occurring within the cell based on characteristic timescales or frequency pertaining to the processes/phenomena for accurately estimating the parameters.

The embodiments herein may obtain features using at least one of a EIS spectra and a Constant Current-Constant Voltage (CC-CV) charge-Constant Current (CC) discharge response estimate the parameters, wherein the EIS spectra is obtained using the EIS model and the CC-CV charge-CC discharge response is obtained using the ROM.

The embodiments herein may ensure that specific parameters, estimated using the EIS model and the ROM, are sensitive to features of the EIS spectra (obtained using the EIS model) and features of the charge-discharge response (obtained using the ROM); wherein the sensitivity ensures that the estimated parameters will be accurate.

The embodiments herein may estimate the parameters based on the features obtained using at least one of the EIS spectra and the CC-CV charge-CC discharge response.

The embodiments herein may enable detection of updates in the parameters after the cell is installed in a device and after the cell had undergone usage for accommodating changes in the parameters due to cell aging and cell replacement, and estimating the updates in the parameters.

Embodiments herein disclose methods and systems for estimating parameters pertaining to an electrochemical model of a cell for accurately predicting the state of the cell. The estimated parameters can be classified as thermodynamic parameters, kinetic parameters, geometric parameters, or transport parameters. The embodiments utilize Electrochemical Impedance Spectroscopy (EIS) and relevant cycling data (charge or discharge responses) of the cell, in conjunction with at least one of an EIS model and a Reduced Order Model (ROM) to estimate the parameters. The embodiments isolate individual electrochemical processes/phenomena occurring within the cell based on characteristic timescales or frequency pertaining to the processes/phenomena occurring within the cell for accurately estimating the parameters.

The embodiments include obtaining features using at least one of a EIS spectra and a Constant Current-Constant Voltage (CC-CV) charge and a Constant Current (CC) discharge response to estimate the parameters, wherein the EIS spectra is obtained using the EIS model and the CC-CV charge-CC discharge response is obtained using the ROM. The embodiments ensure that specific parameters, estimated using the EIS model and/or the ROM, are sensitive to features of the EIS spectra (obtained using the EIS model) and features of the CC-CV charge-CC discharge response (obtained using the ROM). The embodiments include estimating the parameters based on the features obtained using at least one of the EIS spectra and the CC-CV charge-CC discharge response.

The embodiments include detecting updates in the parameters after the cell is installed in a device or electric vehicle. The parameters are likely to get updated after the cell undergoes charging/discharging cycles. The embodiments can accommodate the updates in the parameters due to aging of the cell and/or cell replacement by estimating the updates in the parameters.

FIG. 1 depicts a device 100 configured to predict the state of a cell 105 by estimating a plurality of parameters of the cell 105, according to embodiments as disclosed herein. The plurality of parameters can be utilized by electrochemical models for accurately predicting the state of the cell 105. In an example, predicting the state of the cell 105 includes predicting at least one of State Of Charge (SOC), State Of Health (SOH), and State Of Power (SOP). The plurality of parameters of the cell 105 can be estimated prior to installing the cell 105 in an electrical device, an electronic device, a mechanical device, or an electric vehicle. This can be referred to as offline estimation. The device 100 can include a processor 102. The processor 102 hosts electrochemical models and EIS models for estimating the plurality of parameters of the cell 105 and predicting the state of the cell 105.

Once the cell 105 is installed in the electrical device, the electronic device, the mechanical device, or the electric vehicle, a Battery Management System (BMS) can estimate the plurality of parameters, and detect whether there is (are) update(s) in at least one of the plurality of parameters. This can be referred to as online estimation. Therefore, the BMS can be referred as the device 100 during online estimation. The BMS (100) can include a processor, which is identical to the processor 102, and, therefore, can estimate the plurality of parameters of the cell 105 and predict the state of the cell 105. As depicted in FIG. 1, the device 100 can include the processor 102. The BMS (100) includes a Power Management Integrated Circuit (PMIC) 101. The PMIC 101 includes the processor (102)—(identical to the processor 102), a memory 103 and a display 104. The values of the plurality of parameters, which have been estimated offline, can be stored in the memory 103. The BMS (100) can be hosted in a device (not shown) or an electric vehicle (not shown). In an embodiment, the cell 105 can be a Lithium (Li) cell.

In an embodiment, at least one of an EIS model and a ROM can be utilized for estimating the plurality of parameters. In an embodiment, the processor 102 can utilize the ROM for estimating the plurality of parameters based on a plurality of features of a charge-discharge profile of the cell 105. The ROM can obtain the charge-discharge profile of the cell 105 and ensure that the plurality of parameters to be estimated using the ROM are sensitive to the plurality of features of the charge-discharge profile. In another embodiment, the processor 102 can utilize the EMS model and the ROM for estimating the plurality of parameters. This can be referred to as a cascade approach, wherein both the EMS model and the ROM independently determine the plurality of parameters, which are sensitive to at least one of the EIS model and the ROM. The EMS model can provide at least one parameter, from amongst the plurality of parameters, to the ROM. The ROM can determine a sub-set of the plurality of parameters and utilize the at least one parameter received from the EIS model.

The EIS model and the ROM can estimate values of the plurality of parameters and compare the values of the estimated plurality of parameters with experimentally determined values of the plurality of parameters. The embodiments aim at reducing any existing differences between the estimated and experimental values to improve the accuracy of the estimated values of the plurality of parameters. In an embodiment, the plurality of parameters can be estimated prior to hosting in the device or the electric vehicle. This can be referred to as off-line estimation. The embodiments include estimating the values of the parameters after the cell 105 is hosted in the device or the electric vehicle. This can be referred to as on-line estimation. The embodiments determine whether at least one value of at least one parameter had undergone any change due to aging of the cell 105 or replacement of at least one cell 105 (in a battery pack in the device or the electric vehicle.

The electrochemical models can predict the dynamics of the cell 105 using the physical parameters of the cell 105. The EIS model can be utilized for predicting an EIS spectrum of the cell 105. As discussed, the ROM can predict the charge-discharge response of the cell 105. The embodiments can determine a plurality of features from each of the EIS spectrum and the charge-discharge response. The embodiments include estimating the parameters based on the plurality of features. The processor 102 can utilize at least one optimization technique to minimize errors in the estimated values of the plurality of parameters of the cell 105. In an embodiment, the estimation techniques include genetic algorithm, particle swarm optimization, gradient descent, and so on.

The EIS spectra can isolate individual electrochemical processes (or phenomena) occurring within the cell 105 (including electrodes, separators, and electrolyte) based on characteristic timescales pertaining to the processes. The isolation of individual processes enables qualitative and quantitative analysis of various parameters such as electron transport, reaction rates, intercalation processes, mass transport, electrode structure, and so on. In an embodiment, considering the cell 105 to be in a state of equilibrium, the cell 105 is subjected to perturbation by applying a signal.

The amplitude of the signal can vary with time and have specific mean amplitude. The embodiments include observing a response (output) of the cell 105 with respect to the frequency of the applied signal (input). This behavior can be replicated in the EIS model by linearizing the equations of the EIS model and corresponding boundary conditions at the equilibrium state (of the cell 105).

Figure 2:
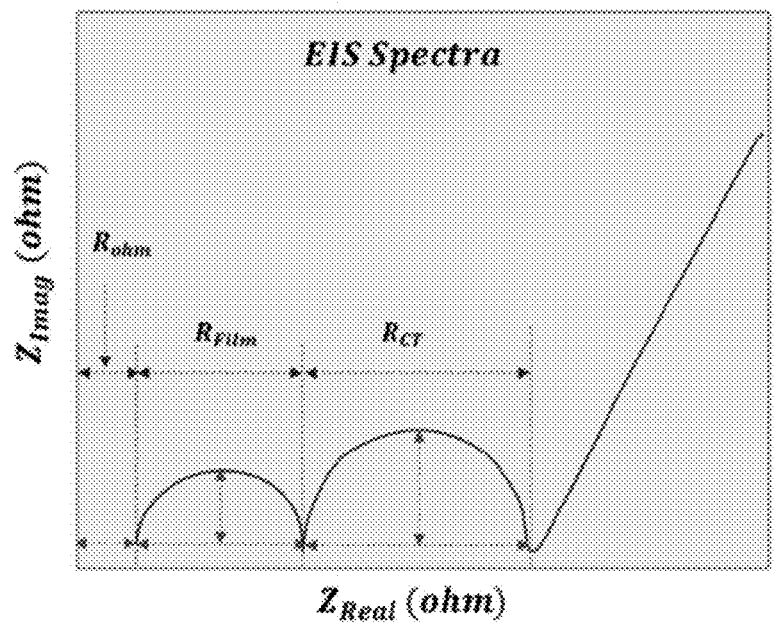
FIG. 2 depicts an example Electrochemical Impedance Spectroscopy (EIS) spectra obtained using an EIS model, according to embodiments as disclosed herein.

The EIS model is used for determining the impedance of the cell 105. The impedance of the cell 105 is determined based on solid state potentials of positive and negative electrodes of the cell 105. The impedance of the cell 105 is a combination of an impedance of the positive electrode, impedance of the negative electrode, and impedance of a separator. The separator is between the positive and negative electrodes. The EIS model can determine the impedances of the positive electrode, negative electrode, and the separator. The impedance profile of the cell 105 can be depicted using an EIS spectrum, as depicted in FIG. 2. The horizontal axis (abscissa) depicts the real (resistance) component of the impedance and the vertical axis (ordinate) depicts the imaginary (reactance) component of the impedance. The EIS spectrum depicts at least one of the electronic resistances in the positive and negative electrodes, solid phase diffusion resistances at the positive and negative electrodes, and charge transfer resistance.

In an embodiment, the impedance of the positive electrode can be determined based on at least one of an electrolyte potential at the positive electrode, the thickness of the cell 105, the thickness of the separator, and a solid state potential of the positive electrode. In an embodiment, the impedance of the negative electrode can be determined based on electrolyte potential at the negative electrode, thickness of the negative electrode, and solid state potential of the negative electrode. In an embodiment, the impedance of the separator is determined based on the thickness of the separator and an electrolyte ionic conductivity. The values of the impedances of the positive electrode, the negative electrode, and the separator are reflected in the EIS spectrum.

Figure 3:
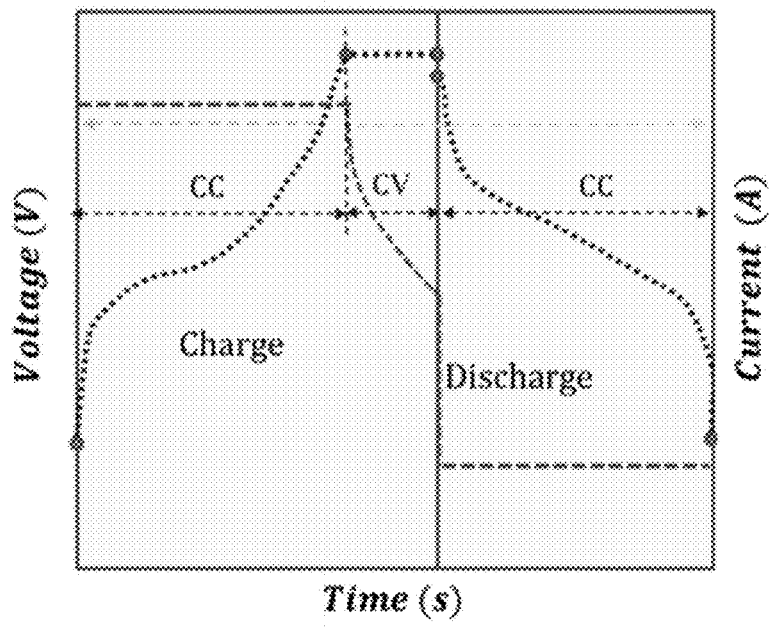
FIG. 3 depicts an example Constant Current-Constant Voltage (CC-CV) charge-Constant Current (CC) discharge response obtained using a Reduced Order Model (ROM), according to embodiments as disclosed herein.

The ROM can be used for determining the voltage of the cell 105. The voltage of the cell 105 is potential drop across the positive and negative electrodes of the cell 105. The ROM can determine the potential of the positive electrode and the potential of the negative electrode to determine the voltage of the cell 105. The potential drop across the positive and negative electrodes is utilized for obtaining a CC-CV charge and a CC discharge response. The CC-CV charge and the CC discharge response are depicted in FIG. 3. In an embodiment, the potential of the positive electrode can be determined based on the solid state potential of the positive electrode. In an embodiment, the potential of the negative electrode can be determined based on the solid state potential of the negative electrode. There can be rest periods after a charging/discharging cycle. In an embodiment, the rest period can be modeled as an exponential decay model for determining a time constant and/or an initial constant.

In an embodiment, the solid state potential of the positive electrode can be determined based on at least one of an electrolyte potential of the positive electrode, an open circuit potential of the positive electrode, an exchange current density at the positive electrode, and an intercalation current at the positive electrode. In an embodiment, the solid state potential of the negative electrode can be determined based on at least one of an electrolyte potential of the negative electrode, an open circuit potential of the negative electrode, an exchange current density at negative electrode, and an intercalation current at the negative electrode.

The estimated plurality of parameters of the cell 105 include, but not limited to, active material volume fraction in the positive electrode, active material volume fraction in the negative electrode, electrolytic volume fraction in the positive electrode, electrolytic volume fraction in fraction in the negative electrode, electrolytic volume fraction in the separator, reaction rate constant for the positive electrode, reaction rate constant for the negative electrode, Brugmann constant, initial lithium ion concentration in the electrolyte, solid phase diffusion of the positive electrode, solid phase diffusion of the negative electrode, particle radii of the positive electrode, particle radii of the negative electrode, and so on.

Offline Estimation:

During the operation of the cell 105, the primary driver of voltage of the cell 105 is the Open Circuit Voltage (OCV). The actual voltage of the cell 105 deviates from the OCV due to polarization or losses. This polarization is classified into three types, viz., activation polarization, concentration polarization, and Ohmic polarization. The activation polarization describes losses associated with charge transfer kinetics during an electrochemical reaction. These losses are determined by the reaction rate constants for the positive and negative electrodes. The concentration polarization is the loss associated with the diffusive mass transport limitations. These losses are primarily controlled by solid phase diffusions of the positive and negative electrodes. The Ohmic polarization represents the potential drop due to electronic resistances in the positive and negative electrodes and ionic resistance in electrolyte. The electronic resistances driven by the respective electronic conductivities of the positive and negative electrodes. The ionic resistance is present in the positive and negative electrodes and the separator. The losses are dependent on the properties of the material constituting the cell 105, which are dependent on the SOC of the cell and temperature. The losses are also dependent on cell loading, which can be modeled using volume fraction of the active material in the positive and negative electrodes.

Within the cell 105, there can be multiple phenomena occurring in sequence. For instance, during the discharge cycles, lithium ions de-intercalate from one of the electrodes, through an electrochemical reaction process, move across the electrolyte by diffusive and migratory modes of transport, and finally intercalate and diffuse into the other electrode. The processes of intercalation of lithium ions from one electrode, traversal of the lithium ions through the electrolyte and intercalation of the lithium ions at the other electrode occur in different time scales. In general, the cell rate capability depends on the slowest of the three processes. As the material properties of the cell 105 change with respect to the SOC of the cell 105, temperature, and the loading conditions, the slowest process can also change based on the overall environment in which the cell 105 is operating.

The different types of losses (causing deviation of the voltage of the cell 105 from the OCV of the cell 105) can occur at different timescales. For example, the potential drop due to Ohmic polarization can occur instantaneously, whereas the potential drop due to the diffusive mass transport limitations (concentration polarization controlled by the solid phase diffusions of the positive and negative electrodes) can span over a longer time period. These differences allow isolating the plurality of parameters into groups of related parameters through activating the cell 105 at the appropriate time scales or frequency pulses.

The capacity of the cell 105 depends on the choice of electrode active material and electrode design. The cell 105 can be classified as a power density cell or an energy density cell. The capacity of the cell 105 and the type (energy or power) of the cell 105 depends not only on type of active material but also depends on geometric parameters of the electrodes of the cell 105 such as electrode thickness, particle radius, electrode area and fraction of active material. For a power cell, the capacity of the cell 105 is dependent on other factors (apart from the properties of the active material of the electrodes) are small particle size, small electrode thickness, low loading of active material, and so on. Therefore, the parameters such as electrode thickness, particle radius, electrode area and fraction of active material can be considered as geometric properties of the cell 105.

Figure 4:
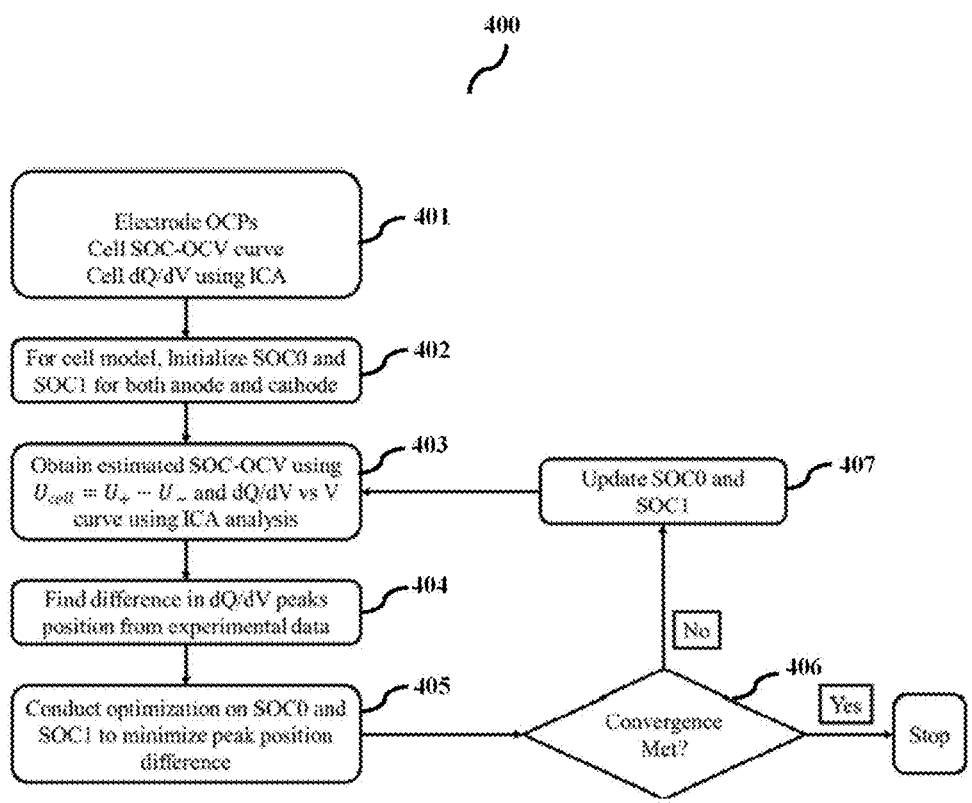
FIG. 4 is a flowchart depicting a method for estimating operating bounds (State of Charge (SOC) bounds) of the electrodes of the cell, according to embodiments as disclosed herein.

The OCV of the cell 105 ($U_{cell}$) can be defined as difference between equilibrium potentials of the positive electrode (U+) and negative electrodes (U-). The equilibrium potentials of the positive and negative electrodes, U+ and U-, can be obtained either based on the active materials of the positive and negative electrodes of the cell 105 or through experimental Open Circuit Potential (OCP) test. FIG. 4 is a flowchart 400 depicting a method for determining operating bounds (SOC bounds) of the electrodes of the cell 105. In an embodiment, the SOC bounds of both the positive and negative electrodes are determined when the cell 105 is operated from a fully charged state (SoC of 100%) to fully discharge state (SOC of 0%).

Figure 5A:
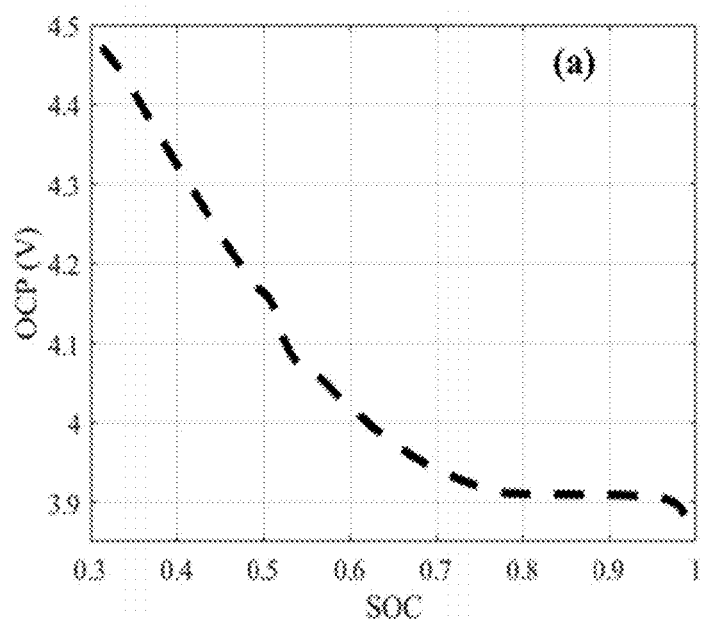
FIG. 5a is a graph depicting a variation of Open Circuit Potential (OCP) of a positive electrode of the cell, with respect to SOC, according to embodiments as disclosed herein.
Figure 5B:
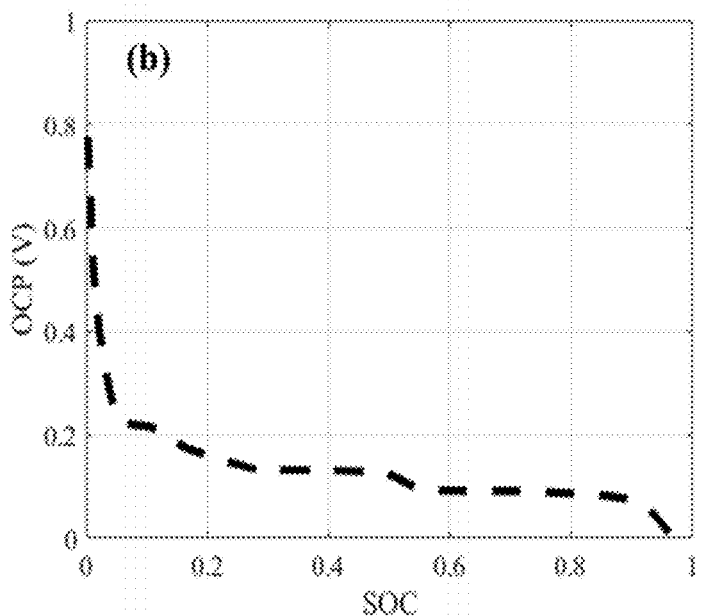
FIG. 5b is a graph depicting a variation of OCP of a negative electrode of the cell with respect to the SOC, according to embodiments as disclosed herein.

At step 401, the method includes provides the OCP of the positive electrode, the OCP of the negative electrode and an experimentally determined OCV as input. In an embodiment, the experimental OCV is determined based on the OCP of the positive electrode, the OCP of the negative electrode. The OCV of the cell 105 is estimated as based on U+ and U-, wherein the U+ and U-, can be determined based on the active materials used in the positive and negative electrodes. As depicted in FIG. 5a, based on the received OCP of the positive electrode, the embodiments include obtaining a plot depicting a variation of the OCP of the positive electrode with respect to the SOC. As depicted in FIG. 5b, based on the received OCP of the negative electrode, the embodiments include obtaining a plot depicting a variation of the OCP of the negative electrode with respect to the SOC.

Figure 5C:
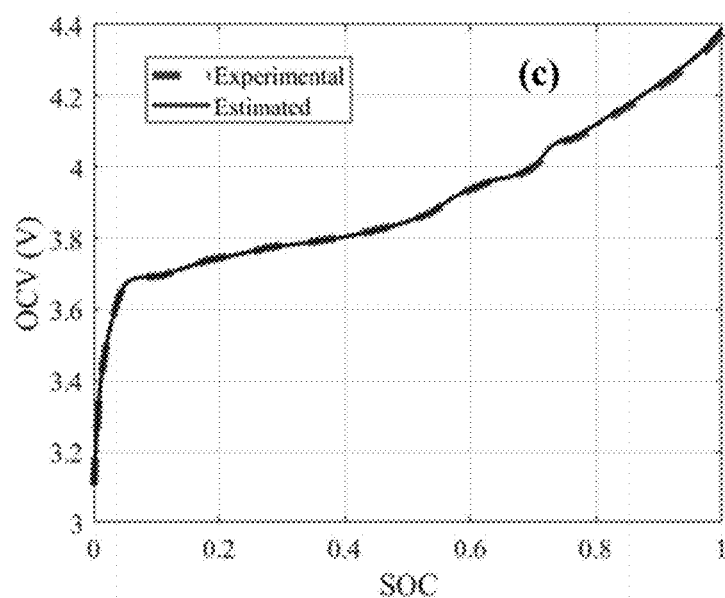
FIG. 5c is a graph depicting a variation of Open Circuit Voltage (OCV) of the cell with respect to the SOC, according to embodiments as disclosed herein.

At step 402, the method includes initializing, for a particular electrochemical model (EIS model or ROM), SOC bounds of the positive electrode (SOC-1) and SOC bounds (SOC-2) of the negative electrode. At step 403, the method includes obtaining a plot depicting a variation of the estimated OCV of the cell 105 with respect to the SOC. The OCV is estimated based on the equilibrium potentials of the positive and negative electrodes. In an example, the active material used in the positive electrode is Lithium Cobalt Oxide (LCO) and the active material used in the negative electrode is Natural Graphite (NG). FIG. 5c depicts a plot of variation of the OCV of the cell 105 with respect to the SOC. The plot (depicted in FIG. 5c) also depicts a variation of the experimental OCV with respect to the SOC. The plots indicating the variations of the estimated OCV and the experimental OCV, with respect to the SOC, match.

Figure 5D:
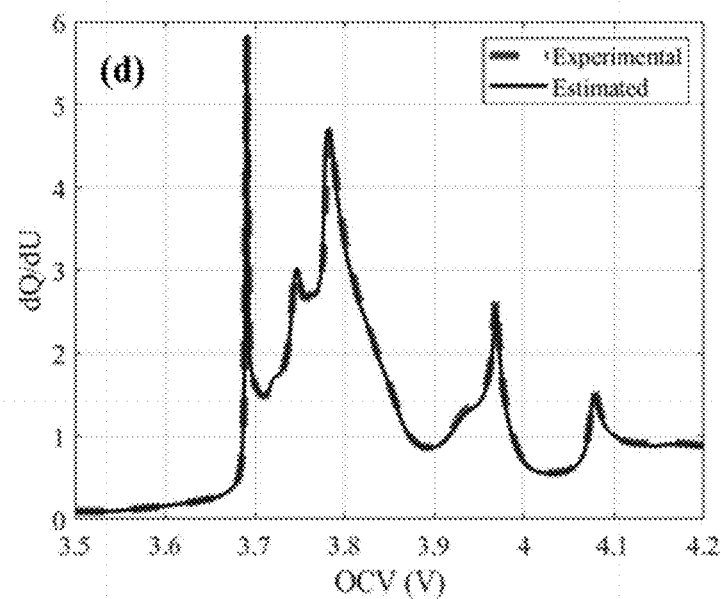
FIG. 5d is a graph depicting a variation of $dQ/dU_{cell}$ (capacity of the cell) with respect to an estimated OCV of the cell and a variation of $dQ/dU_{cell}$ with respect to an experimental OCV of the cell, according to embodiments as disclosed herein.

The embodiments include determining a rate of change (variation) of charge with respect to the OCV of the cell 105. The rate of change of charge (Q) stored in the cell 105 (which depends on the SOC) with respect to the OCV of the cell 105 ($dQ/dU_{cell}$) represents the capacity of the cell 105. The embodiments include obtaining a variation of $dQ/dU_{cell}$ with respect to the estimated OCV of the cell 105. The embodiments include obtaining a variation of $dQ/dU_{cell}$ with respect to the experimental OCV of the cell 105. FIG. 5d depicts plots indicating the variation of $dQ/dU_{cell}$ with respect to the estimated OCV of the cell 105 and the variation of $dQ/dU_{cell}$ with respect to the experimental OCV of the cell 105. As depicted in FIG. 5d, the plots indicating the variations of $dQ/dU_{cell}$ ($U_{cell}$ representing the estimated OCV and the experimental OCV in the corresponding variations indicated in the plots), with respect to the estimated OCV and the experimental OCV, match.

Considering that the matching has not occurred, the method includes, at step 404, comparing peaks in the plot of variation of $dQ/dU_{cell}$ with respect to the estimated OCV of the cell 105 with peaks in the plot of variation of $dQ/dU_{cell}$ with respect to the experimental OCV of the cell 105. In an embodiment, differences between the amplitudes and corresponding positions of the peaks in each of the plots (the plot of variation of $dQ/dU_{cell}$ with respect to the estimated OCV of the cell 105 and the plot of variation of $dQ/dU_{cell}$ with respect to the experimental OCV of the cell 105) is detected.

At step 405, the embodiments include optimizing the SOC bounds of each of the positive and negative electrodes for match. The optimization is performed for matching the positions of peaks in each of the plots (the plot of variation of $dQ/dU_{cell}$ with respect to the estimated OCV of the cell 105 and the plot of variation of $dQ/dU_{cell}$ with respect to the experimental OCV of the cell 105) and ensuring that the amplitudes of the peak are same. At step 406, the method includes determining whether there is a convergence between the positions and the amplitudes of the peaks in each of the plots. The positions represent the voltage of the cell 105. If it is detected convergence is not attained, the method includes, at step 407, adjusting the initialized values of the SOC bounds of each of the positive and negative electrodes.

Based on the initialized values of the SOC bounds of each of the electrodes, the plot indicating the variation of $dQ/dU_{cell}$ with respect to the estimated OCV of the cell 105 is obtained. The matching can be achieved by adjusting $SOC_{max}$ and $SOC_{min}$ of each of the positive and negative electrodes of the cell 105 using gradient based optimization methods. The voltage of the cell 105 at which the peaks occur in the plot indicating the variation of $dQ/dU_{cell}$ with respect to the estimated OCV of the cell 105 is updated by the adjustment of the SOC bounds of each of the positive and negative electrodes. As depicted in FIG. 5d, the cell voltages at which the peaks in the plot (indicating the variation of $dQ/dU_{cell}$ with respect to the estimated OCV of the cell 105) occur are close to the cell voltages at which peaks in the plot (indicating the variation of $dQ/dU_{cell}$ with respect to the experimental OCV of the cell 105) occur. In an example, when the cell 105 is fully charged, the SOC bounds of the positive and negative electrodes are 0.338 and 0.951 respectively. On the other hand, when the cell 105 is fully discharged, the SOC bounds of the positive and negative electrodes are 0.961 and 0.0019 respectively.

The various actions in the flowchart 400 may be performed in the order presented, in a different order, or simultaneously. Further, in some embodiments, some actions listed in FIG. 4 may be omitted.

The OCP of the positive electrode and the OCP of the negative electrode can be considered as thermodynamic properties of the cell 105. The reaction rate constants at the positive and negative electrodes can be considered as kinetic parameters of the cell 105. The magnitude of the kinetic parameters can be estimated using the EIS spectrum. In an embodiment, the intermediate region of the EIS spectrum, represented by the semi-circle (depicted in FIG. 2), is used for determining the kinetic parameters. The magnitude of the kinetic parameters can also be determined using the CC-CV charge and CC discharge profile of the cell (depicted in FIG. 3).

The embodiments include sending the estimated capacity of the cell 105 and the SOC bounds ($SOC_{max}$ and $SOC_{min}$) of each of the positive and negative electrodes to the EIS model.

The transport of electrons from the positive electrode to the negative electrode and the transport of electrons from the negative electrode to the positive electrode depend on the electronic conductivities of the positive and negative electrodes. If the cell 105 is a lithium cell, the lithium ions transported from the positive electrode to the negative electrode and the lithium ions transported from the negative electrode to the positive electrode depend on ionic conductivity and ionic diffusivity. The transport of lithium from the surface of the electrodes to the internal particles of the active material of the electrodes and the transport of lithium from the internal particles of the active material of the electrodes to the surface of the electrodes depends on lithium diffusion. Therefore, the parameters such as electronic conductivity, ionic conductivity, ionic diffusivity, diffusion, and so on, can be considered as the transport parameters of the cell 105.

The response time scale of electronic conductivity in the active material and ionic conductivity in the electrolyte is generally low (few microseconds to a few milliseconds). The magnitude of the electronic conductivity in the active material and the ionic conductivity in the electrolyte can be estimated from the high frequency region of EIS spectra and from the initial period of the CC-CV charge and CC discharge profile of the cell 105. The time scale of the ionic diffusivity in electrolyte phase is high (few milliseconds). The magnitude of the ionic diffusivity can be estimated from the low frequency region of the EIS spectra and from the initial period of the CC-CV charge and CC discharge profile of the cell 105. The time scale of ionic transport from particle surface to host sites or from the host sites to the particle surface (diffusion) is high (few seconds). The magnitude of the diffusion can be estimated from the low frequency region of EIS spectra and the CC-CV charge and CC discharge profile of the cell 105.

The plurality of parameters can be estimated based on the features of the EIS spectrum (derived using the EIS model), and the features of the CC-CV charge and CC discharge response of the cell 105 (derived using the ROM). In order to estimate the plurality of parameters using the EIS model and the ROM, the EIS model and the ROM needs be sensitive to the plurality of parameters. The embodiments include determining the sensitivity of the plurality of parameters to the features of the CC-CV charge and CC discharge response such as total charging time period, CC charging time period, CV charging time period, rest period, CC discharging time period, voltage drop at certain time instances during the discharging cycles, and so on. The embodiments include determining the sensitivity of the plurality of parameters to the features of the EIS response or the EIS spectrum such as magnitude of impedance at the valley point, magnitude of the peak impedance, magnitude of impedance of the lowest frequency, and so on.

In an embodiment, the EIS model (features of the EIS spectrum) is sensitive to parameters such as particle radii of the positive and negative electrodes, electrolyte volume fraction in the positive electrode, electrolyte volume fraction in the negative electrode, electrolyte volume fraction in the separator, volume fraction of the active material in the positive electrode, volume fraction of the active material in the negative electrode, electronic conductivity of the active material of the positive electrode, electronic conductivity of the active material of the negative electrode, ionic concentration (such as Li ion concentration if the cell 105 is a Li cell) in the electrolyte, thickness of the positive electrode, thickness of the negative electrode, and Brugmann constant.

In an embodiment, the ROM (features of the CC-CV charge and CC discharge profile of the cell 105) can be sensitive to parameters such as particle radius of the positive electrode, particle radius of the negative electrode, electrolyte volume fraction in the positive electrode, electrolyte volume fraction in the negative electrode, reaction rate constant at the positive electrode, reaction rate constant negative electrode, thickness of the positive electrode, thickness of the negative electrode, Brugmann constant, solid phase diffusion in the positive electrode, and solid phase diffusion in the negative electrode.

The embodiments include optimizing the estimated values of the parameters with experimentally determined values of the parameters. In an embodiment, global optimization methods can be utilized. In an embodiment, genetic algorithm is used for the performing the optimization of the plurality of parameters. In another embodiment, particle swarm optimization is used for performing the optimization of the plurality of parameters. In an embodiment, a Kalman filter can be utilized in the particle swarm optimization for faster convergence of the plurality of parameters. The usage of Kalman correction with particle swarm optimization allows estimating the plurality of parameters of the cell 105, which is governed by complex heterogeneous phenomena occurring simultaneously within the cell 105. In an embodiment, the cost function used for optimizing the plurality of parameters can be a combination of mean square error and absolute error. Therefore, the global optimum cost function value is likely to be zero. The target value, i.e. the global optimum value is assumed to be corrupted with zero mean white noise (Gaussian noise).

Figure 6:
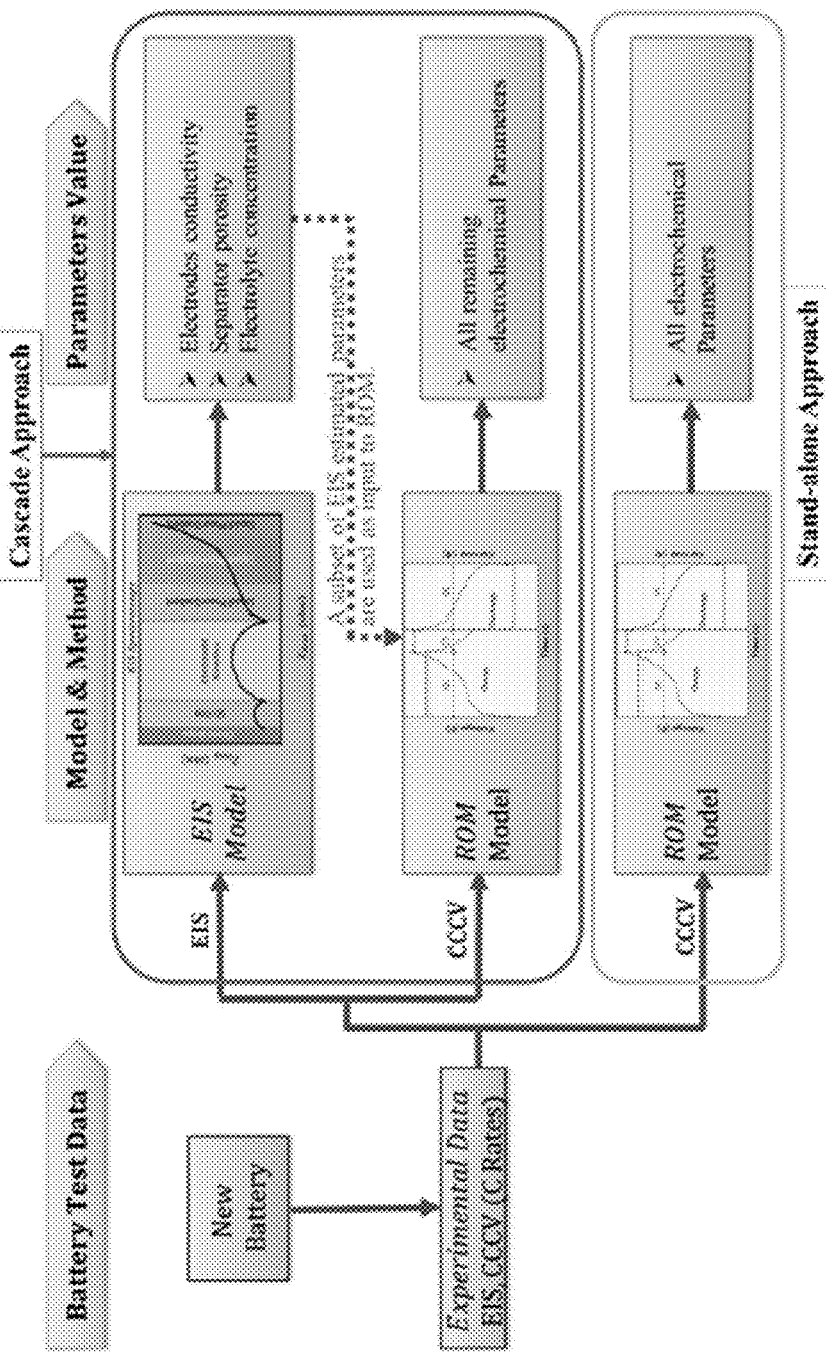
FIG. 6 depicts the estimation of the plurality of parameters of the cell using at least one of the EIS model and the ROM, according to embodiments as disclosed herein.

FIG. 6 depicts the estimation of the plurality of parameters of the cell 105 using at least one of the EIS model and the ROM. As depicted in FIG. 6, two approaches can be used for estimating the plurality of parameters. In the first approach, the ROM is used for estimating all of the plurality of parameters. This approach can be referred to as standalone approach. In the second approach, the EIS model is used for estimating all of the plurality of parameters. A sub-set of the plurality of parameters is passed to the ROM. The ROM can estimate the remaining parameters using the CC-CV charging and CC discharging profile. This approach can be referred to as cascade approach. Initially, experimental data is obtained from the cell 105. The experimental data includes the OCV of the cell 105, which is obtained using OCP tests, and equilibrium potentials of the positive and negative electrodes. In an embodiment, the impedance profile of the cell 105 can be obtained. The impedance profile is depicted in the EIS spectrum. The embodiments include obtaining a CC-CV charge and CC discharge profile of the cell 105. The EIS spectrum is provided to the EIS model, and the CC-CV charge and CC discharge profile is provided to the ROM.

Figure 7A:
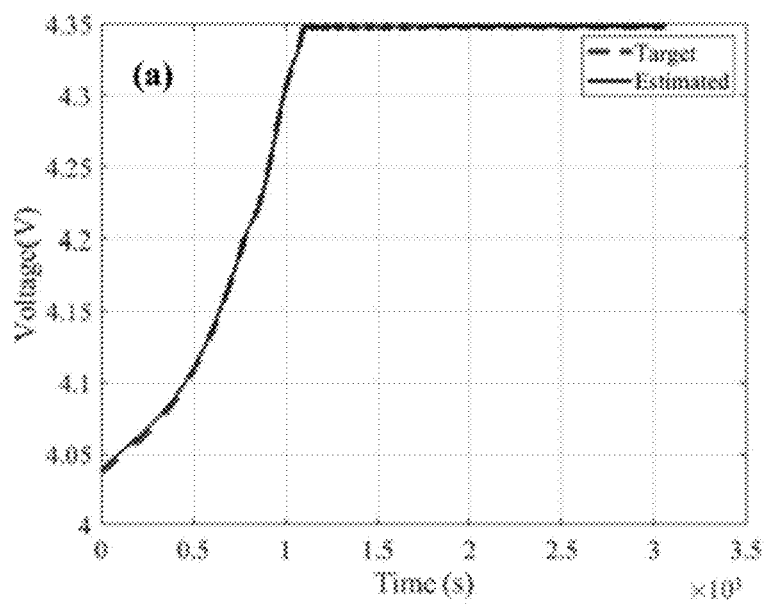
FIGS. 7a and 7b depict convergence between an estimated voltage charge-discharge profile and a target voltage charge-discharge profile obtained using a standalone approach (only ROM is used for determining the parameters), according to embodiments as disclosed herein.
Figure 7B:
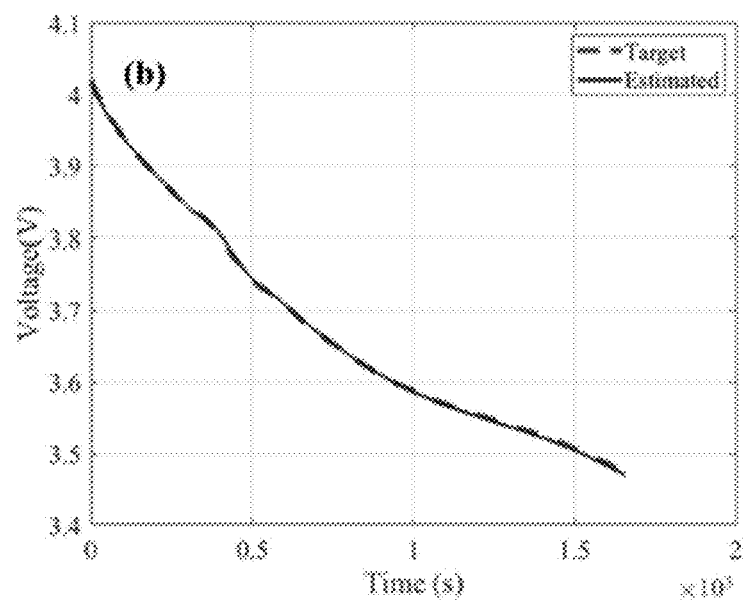

In an embodiment, particle swarm optimization can be applied on the ROM in the standalone approach to estimate all of the plurality of parameters. The particle swarm optimization is applied on a target voltage charge discharge profile and the ROM estimates all of the plurality of parameters. In an example, the particle swarm optimization can be run with 150 particles and 25 iteration steps. FIGS. 7a and 7b depict convergence between an estimated voltage charge-discharge profile and the target voltage charge-discharge profile obtained using the standalone approach. FIG. 7a depicts convergence between the estimated and target voltage charging profiles. FIG. 7b depicts convergence between the estimated and target voltage discharging profiles. The Root Mean Square (RMS) accuracy in voltage prediction (convergence between the estimated and target voltage profiles) is 99.97% for charging, and 99.96% for discharging.

Figure 8:
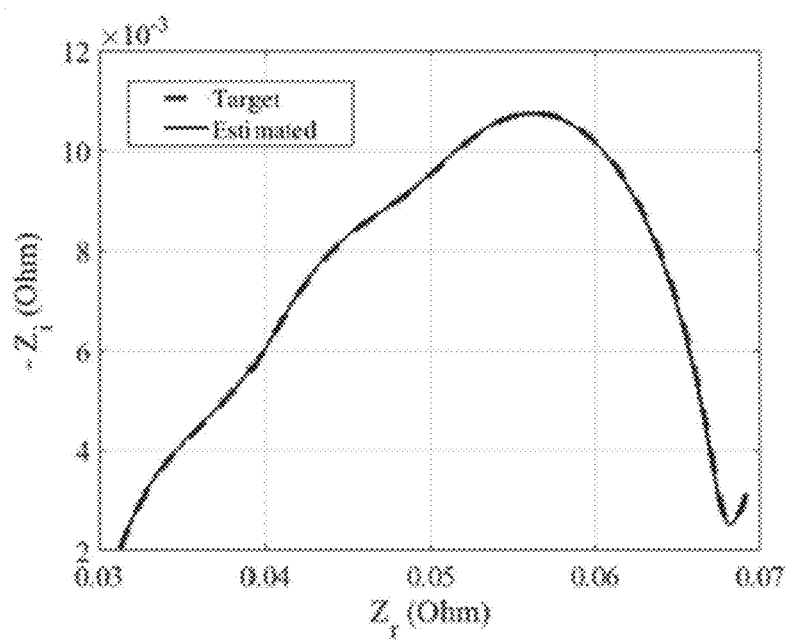
FIG. 8 depicts convergence between an estimated EIS profile (spectrum) and a target EIS profile (spectrum), according to embodiments as disclosed herein.

In an embodiment, particle swarm optimization can be initially applied on the EIS model in the cascade approach. The EIS model can be utilized for estimating all of the plurality of parameters. In an example, the particle swarm optimization can be run with 1500 particles and 50 iterations using the EIS spectrum. As the run-time of the EIS model is low, the optimization can be run with a larger number of particles and iterations. FIG. 8 depicts convergence between an estimated EIS profile (spectrum) and a target EIS profile (spectrum). The RMS accuracy (convergence between the estimated and target EIS profiles) is 99.88% for the real part of the EIS profile and 99.91% for the imaginary part of the EIS profile.

Once, all of the plurality of parameters is estimated using the EIS model, a subset of the plurality of parameters can be estimated using charge-discharge response. The particle swarm optimization can be applied on the ROM and the ROM can utilize the charge-discharge response to estimate the subset of the plurality of parameters. In an embodiment, the ROM can estimate the particle radius of the positive electrode, the particle radius of the negative electrode, the electrolyte volume fraction in the positive electrode, the electrolyte volume fraction in the negative electrode, the reaction rate constant at the positive electrode, the reaction rate constant negative electrode, the thickness of the positive electrode, the thickness of the negative electrode, the Brugmann constant, the solid phase diffusion in the positive electrode, and the solid phase diffusion in the negative electrode.

Figure 9A:
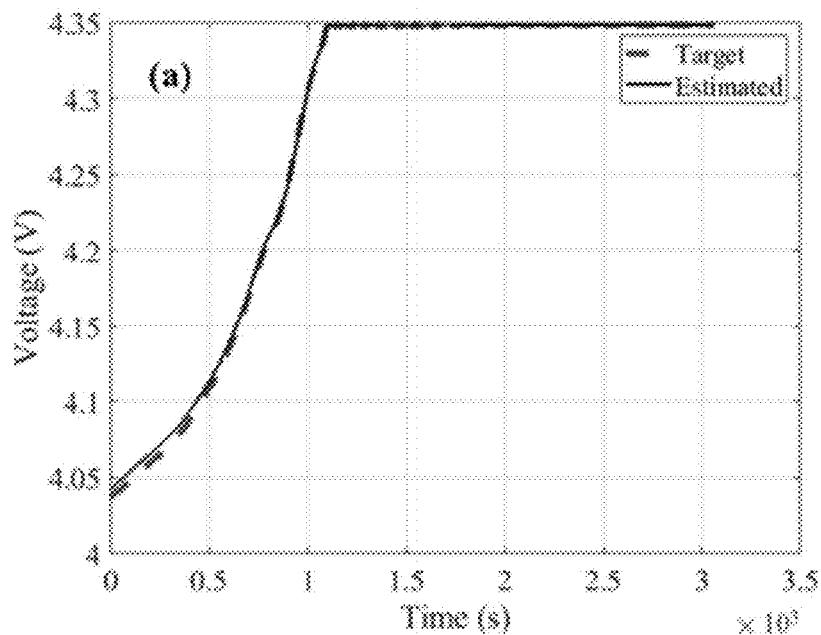
FIG. 9a and FIG. 9b depict convergence between an estimated voltage charge-discharge profile and a target voltage charge-discharge profile obtained using a cascade approach (the EIS model and the ROM is used for determining the parameters), according to embodiments as disclosed herein.
Figure 9B:
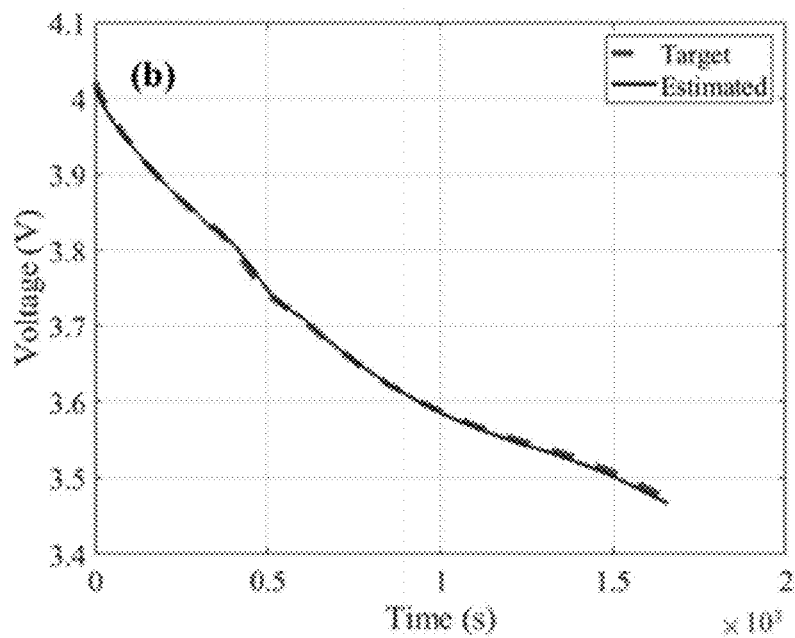

The ROM receives parameters, viz., the electrolyte volume fraction in the separator, the electronic conductivity of the active material of the positive electrode, the electronic conductivity of the active material of the negative electrode, and the concentration of ions in the electrolyte, from the EIS model. The ROM receives the parameters from the EIS model as the ROM is not sensitive to these parameters. FIG. 9a and FIG. 9b depict convergence between an estimated voltage charge-discharge profile and the target voltage charge-discharge profile obtained using the cascade approach. FIG. 9a depicts convergence between the estimated and target voltage charging profiles. FIG. 9b depicts the convergence between the estimated and target voltage discharging profiles. As depicted in the FIGS. 9a and 9b, RMS accuracy in voltage prediction, is 99.93% for charging and 99.9% for discharging. Comparing the results obtained using standalone approach (depicted in FIGS. 7a and 7b) and the cascade approach (depicted in FIGS. 9a and 9b), it is observed that the RMS accuracy is of same order. It can be noted that there is a 25% reduction in computation time if the cascade approach is used, compared to the standalone approach.

In an embodiment, the processor 103 can provide the estimated parameters of the cell 105 to the can be fed to at least one electrochemical model for predicting the state of the cell 105 by predicting at least one of the SOC, the SOH and the SOP.

Online Estimation:

Once the cell 105 is inserted into the electric device, electronic device, mechanical device, or the electric vehicle, the processor (102) can detect whether there is a change in at least one parameter. The at least one parameter can change as the cell 105 undergoes increasing number of charging and discharging cycles and if there is cell replacement. In an embodiment, the at least one parameter that is likely to undergo changes includes resistances of the electrodes and the separator (due to aging of the cell 105), the capacity of the cell 105, the solid phase diffusions at the positive and negative electrodes, and active material volume fractions in the positive and negative electrodes.

Figure 10:
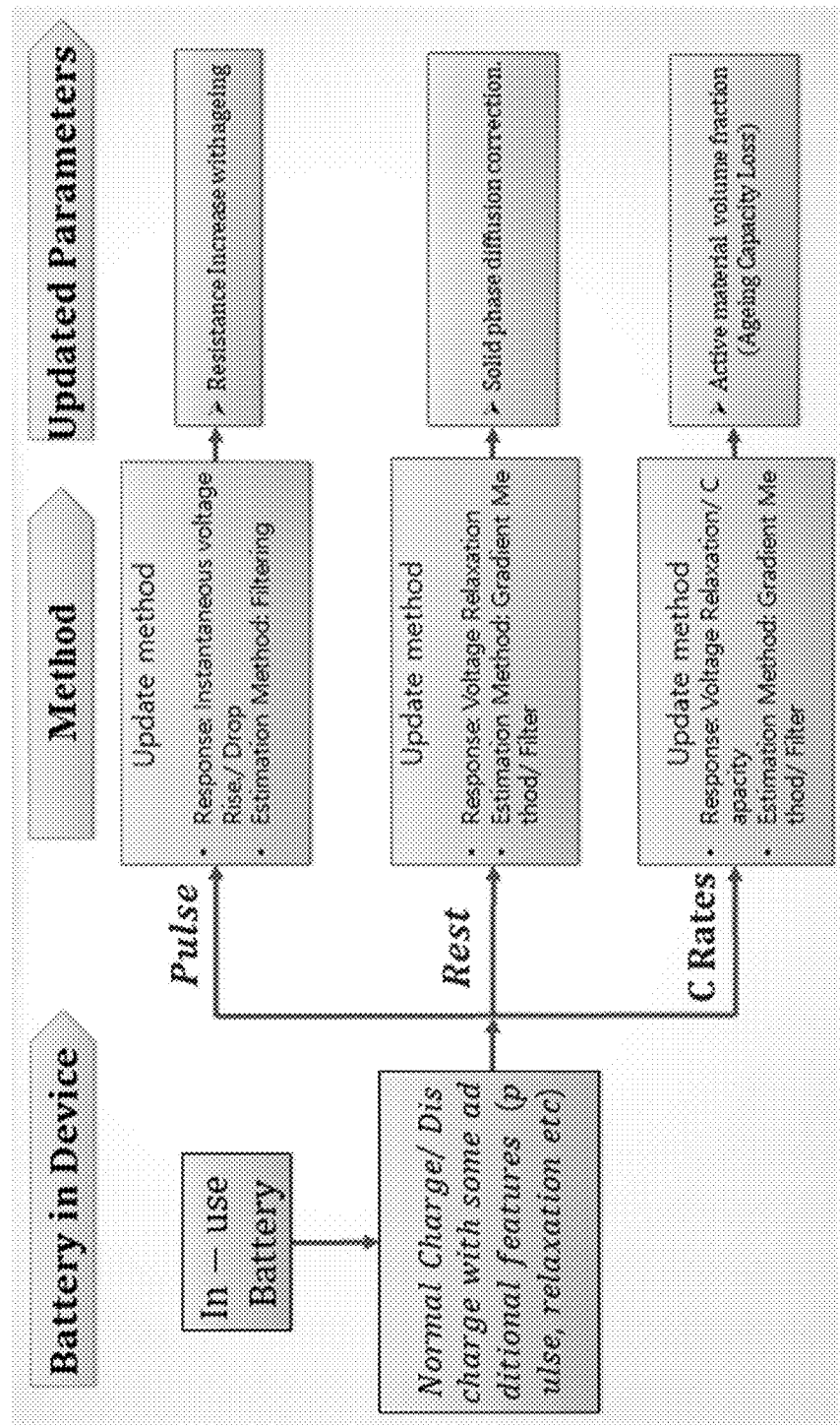
FIG. 10 depicts a protocol for online updating of the at least one parameter of the cell, according to embodiments as disclosed herein.

FIG. 10 depicts a protocol for online updating of the at least one parameter of the cell 105. A burst current is applied to the cell 105. The current can cause a rise/drop in the voltage of the cell 105. In an embodiment, based on updates in the voltage response (voltage rise/drop) of the cell 105, the resistances (impedances) pertaining to the positive and negative electrodes of the cell 105, the resistance of the separator, and the impedance profile of the cell 105 are likely to get updated. In an embodiment, the updates can be reflected as increase in the resistances. The embodiments include estimating the updates in the resistances using a filtering method.

After the cell 105 is fully charged or fully discharged, the cell 105 may not be utilized for a predefined time period. In an example, the predefined time period can be 4 hours. The predefined time period can be referred to as rest period. During the rest period, there is voltage relaxation. The voltage relaxation phenomenon can cause updates in the solid phase diffusion at the positive electrode and the solid phase diffusion at the negative electrode. In an embodiment, a gradient based method or the filtering method can be utilized for estimating the updates in the solid phase diffusion at the positive electrode and the updates in the solid phase diffusion at the negative electrode.

In an embodiment, the cell 105 can be charged or discharged at different C-rates during the different charging or discharging cycles. The capacity of the cell 105 can fade (decrease) as the charging or discharging cycles increases. The cause of the degradation of the capacity of the cell 105 will be reflected in update in the active material volume fraction of the positive electrode (capacity fade of the positive electrode) and/or update in the active material volume fraction of the negative electrode (capacity fade of the negative electrode). In an embodiment, the update in the active material volume fractions of the positive electrode and the update in the active material volume fraction of the negative electrode can be estimated using the gradient based method or the filtering method.

FIG. 1 shows example units of the device/BMS 100, but it is to be understood that other embodiments are not limited thereon. In other embodiments, the device/BMS 100 may include less or more number of units. Further, the labels or names of the units of the device/BMS 100 are used only for illustrative purpose and does not limit the scope of the invention. One or more units can be combined together to perform same or substantially similar function in the device/BMS 100.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments disclosed herein describe methods and systems for estimating parameters of an electrochemical model of a cell for accurately predicting the state of the cell. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the invention may be implemented on different hardware devices, example, using a plurality of Central Processing Units (CPUs).

The BMS 100, the PMIC 101, the processor 102, the memory 103, the processors, and the memories in FIGS. 1 to 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for estimating a plurality of parameters pertaining to an electrochemical model of a cell of a battery comprising lithium-ion, the method comprising:
    obtaining, by a device, a combination of an Electrochemical Impedance Spectroscopy (EIS) spectrum and a Constant Current-Constant Voltage (CC-CV) charge-Constant Current (CC) discharge response of the cell;
    extracting, by the device, a plurality of features from the EIS spectrum and a plurality of features from the CC-CV charge-CC discharge response of the cell; and
    estimating, by the device, the plurality of parameters of the electrochemical model based on at least one of the plurality of features of the EIS spectrum and at least one of the plurality of features of the CC-CV charge-CC discharge response of the cell.

2. The method of claim 1, wherein the EIS spectrum indicates a variation of an impedance of the cell,
    wherein the variation in the impedance of the cell occurs due to variation of frequency of an input pulse applied to the cell,
    wherein the impedance of the cell comprises at least one of an impedance of a positive electrode of the cell, an impedance of a negative electrode of the cell, or an impedance of a separator, and
    wherein the separator is positioned between the positive electrode and the negative electrode.

3. The method of claim 2, wherein the impedance of the positive electrode is determined based on at least one of a solid state potential of the positive electrode, a thickness of the cell, an electrolyte potential at the positive electrode, or a thickness of the separator,
    wherein the impedance of the negative electrode is determined based on at least one of an electrolyte potential at the negative electrode, a thickness of the negative electrode, or a solid state potential of the negative electrode, and
    wherein the impedance of the separator is determined based on at least one of a thickness of the separator or an electrolyte ionic conductivity.

4. A device for estimating a plurality of parameters pertaining to an electrochemical model of a cell of a battery comprising lithium-ion, the device comprising:
    one or more processors configured to:
        obtain a combination of an Electrochemical Impedance Spectroscopy (EIS) spectrum and a Constant Current-Constant Voltage (CC-CV) charge-Constant Current (CC) discharge response of the cell;
        extract a plurality of features from the EIS spectrum and a plurality of features from the CC-CV charge-CC discharge response of the cell; and
        estimate the plurality of parameters of the electrochemical model based on at least one of the plurality of features of the EIS spectrum and at least one of the plurality of features of the CC-CV charge-CC discharge response of the cell.

5. The device of claim 4, wherein the EIS spectrum indicates a variation of an impedance of the cell,
    wherein the variation in the impedance of the cell occurs due to variation of frequency of an input pulse applied to the cell,
    wherein the impedance of the cell comprises at least one of an impedance of a positive electrode of the cell, an impedance of a negative electrode of the cell, or an impedance of a separator, and
    wherein the separator is positioned between the positive electrode and the negative electrode.

6. The device of claim 5, wherein the device further configured to:
    determine the impedance of the positive electrode based at least one of a solid state potential of the positive electrode, a thickness of the cell, an electrolyte potential at the positive electrode, or a thickness of the separator,
    determine the impedance of the negative electrode based at least one of an electrolyte potential at the negative electrode, a thickness of the negative electrode, or a solid state potential of the negative electrode, and
    determine the impedance of the separator based on at least one of a thickness of the separator and an electrolyte ionic conductivity.

7. The device of claim 4, wherein the EIS spectrum comprises a plurality of frequency regions,
    wherein at least one electrochemical process occurs in the cell in each of the plurality of frequency regions, and
    wherein the device further configured to:
        estimate at least one parameter from amongst the plurality of parameters, from each of the plurality of frequency regions based on the at least one electrochemical process occurring in the cell in each of the plurality of frequency regions.

8. The device of claim 4, wherein the device further configured to:
    determine a potential drop across the positive electrode and the negative electrode, based on a solid state potential of the positive electrode and a solid state potential of the negative electrode, and
    obtain the CC-CV charge-CC discharge response based on the potential drop across a positive electrode of the cell and a negative electrode of the cell.

9. The device of claim 8, wherein the device further configured to:
    determine the solid state potential of the positive electrode based on at least one of an electrolyte potential of the positive electrode, an Open Circuit Potential (OCP) of the positive electrode, an exchange current density at the positive electrode, or an intercalation current at the positive electrode, determine the solid state potential of the negative electrode based on at least one of an electrolyte potential of the negative electrode, an OCP of the negative electrode, an exchange current density at negative electrode, or an intercalation current at the negative electrode.

10. The device of claim 8, wherein the device further configured to:

provide State of Charge (SOC) bounds comprising a maximum SOC and a minimum SOC, pertaining to each of the positive electrode and the negative electrode to an EIS model for estimating at least one parameter from amongst the plurality of parameters, and estimate the at least one parameter based on the plurality of features extracted from the EIS spectrum, using the EIS model.

11. The device of claim 10, wherein the device further configured to:

determine the SOC bounds pertaining to each of the positive electrode and the negative electrode, by matching a plot of variation of a rate of change of charge stored in the cell with respect to an estimated Open Circuit Voltage (OCV) of the cell and a plot of variation of a rate of change of charge stored in the cell with respect to an experimental OCV of the cell.

12. The device of claim 4, wherein one or more of the plurality of parameters respectively change responsive to changes to the one or more of the plurality of features of the EIS spectrum and the at least one of the plurality of features of the CC-CV charge-CC discharge response.

13. The device of claim 4, wherein the plurality of features of the EIS spectrum comprises a magnitude of impedance at a valley point in the EIS spectrum, a magnitude of the peak impedance in the EIS spectrum, and a magnitude of impedance of the lowest frequency in the EIS spectrum.

14. The device of claim 4, wherein the plurality of features of the CC-CV charge-CC discharge response includes a total charging time period, a CC charging time period, a CV charging time period, a rest period after a charging cycle, a rest period after a discharging cycle, a CC discharging time period, and a voltage drop at predefined time instances during at least one discharging cycle.

15. The device of claim 4, wherein the device further configured to:

obtain the estimated plurality of parameters by optimizing intermediate values of the plurality of parameters, wherein the optimization continues until the intermediate values of the plurality of parameters match with experimentally determined values of the plurality of parameters, and wherein the intermediate values of the plurality of parameters are optimized using at least one of genetic method, particle swarm optimization, or gradient descent.

16. The device of claim 4, wherein the plurality of parameters comprises a particle radius of an positive electrode of the cell, a particle radius of an negative electrode of the cell, an electrolyte volume fraction in the positive electrode, an electrolyte volume fraction in the negative electrode, an electrolyte volume fraction in the separator, a volume fraction of an active material in the positive electrode, a volume fraction of the active material in the negative electrode, a reaction rate constant at the positive electrode, a reaction rate constant negative electrode, solid phase diffusion in the positive electrode, a solid phase diffusion in the negative electrode, an electronic conductivity of an active material of the positive electrode, an electronic conductivity of the active material of the negative electrode, an ionic concentration in an electrolyte of the cell, the thickness of the positive electrode, the thickness of the negative electrode, and a Brugmann constant.

17. The device of claim 4, wherein the device is further configured to:

detect at least one update in at least one parameter, from amongst the plurality of parameters; and estimate the at least one update in the at least one parameter based on variation in at least one of capacity of the cell, voltage of the cell, current flowing through the cell, or impedance of the cell.

18. The device of claim 17, wherein the detection of the at least one update in the at least one parameter is initiated by at least one of:

applying a current burst on the cell, introducing a rest period of a predefined time duration after charging the cell, introducing a rest period of predefined time duration after discharging the cell, charging the cell at a predefined C-rate for at least one cycle, or discharging the cell at a predefined C-rate for at least one cycle.

19. The device of claim 17, wherein the detection of the at least one update in the at least one parameter is initiated in at least one condition comprising:

the cell has undergone a predefined number of discharging cycles, the cell has undergone a predefined number of charging cycles, or at least one cell in a device or electronic vehicle, hosting the cell, has been replaced.

20. The device of claim 17, wherein the device further configured to:

estimate the variation in at least one of capacity of the cell, voltage of the cell, current flowing through the cell, or and impedance of the cell, based on at least one of a gradient based method or a filtering based method.

* * * * *